United States Patent [19]
Gardner

[11] Patent Number: 6,152,520
[45] Date of Patent: Nov. 28, 2000

[54] MOBILE LIVING QUARTERS WITH RETRACTABLE ROOM

[75] Inventor: Stewart E. Gardner, Bristol, Ind.

[73] Assignee: R-N-R International, Inc., Bristol, Ind.

[21] Appl. No.: 08/929,495

[22] Filed: Sep. 15, 1997

[51] Int. Cl.⁷ .................................................. B60P 3/34
[52] U.S. Cl. ................... 296/175; 52/67; 52/79.5
[58] Field of Search ........................... 296/26.09, 26.1, 296/26.12, 26.13, 26.14, 156, 165, 171, 172, 175, 176; 52/36.1, 67, 79.1, 79.5, 79.7, 79.9

[56] References Cited

U.S. PATENT DOCUMENTS 5,971,471  10/1999  Gardner ................................. 296/165

*Primary Examiner*—D. Glenn Dayoan
*Assistant Examiner*—Paul Chenevert
*Attorney, Agent, or Firm*—Baker & Daniels

[57] ABSTRACT

A slide out room for mobile living quarters, such as a recreational vehicle or manufactured housing is supported by primary and secondary support arms extending from the main living quarters to the outer edge of the floor of the slide out room. The support arms are connected to the slide out room by a pivoting connection and are connected to the main living area by a connection which both pivots and slides vertically. Accordingly, the slide out room is maintained level, and is prevented from tilting or cocking, thereby assuring smooth operation of the slide out room.

15 Claims, 13 Drawing Sheets

MOBILE LIVING QUARTERS WITH RETRACTABLE ROOM

This invention relates to a retractable or slide out room that provides auxiliary living area for mobile living quarters such as recreational vehicles and manufactured housing.

The width of recreational vehicles and manufactured housing is limited to that which may be accommodated for travel on public highways. Accordingly, it has become common to provide recreational vehicles and manufactured housing with retractable rooms which provide an auxiliary living area when the mobile living quarters is parked for use, but which may be retracted into the main living area when the mobile living quarters is moved. However, slide out rooms are of necessity relatively heavy, so that the weight of the room causes tilting and binding, sometimes making it difficult to extend or retract the room. This is particularly important when a power drive is used to operate the room, because power drives have limited power. Accordingly, if the retractable room binds or tilts it is often impossible for the power drive to operate the room.

According to the present invention, a retractable room is provided with support arms which pivotally and slidably attach to the floor of the room and to the edge of the wall defining the aperture through which the retractable room extends and retracts into the main living area. Accordingly, the retractable room is supported and guided as it is extended and retracted, thereby preventing tilting and misalignment of the room with respect to the aperture. Accordingly, the room can be extended or retracted with relatively little force, so that the room operates reliably.

These and other advantages of the present invention will be apparent from the following description, with reference to the accompanying drawings, in which.

Figure 1:
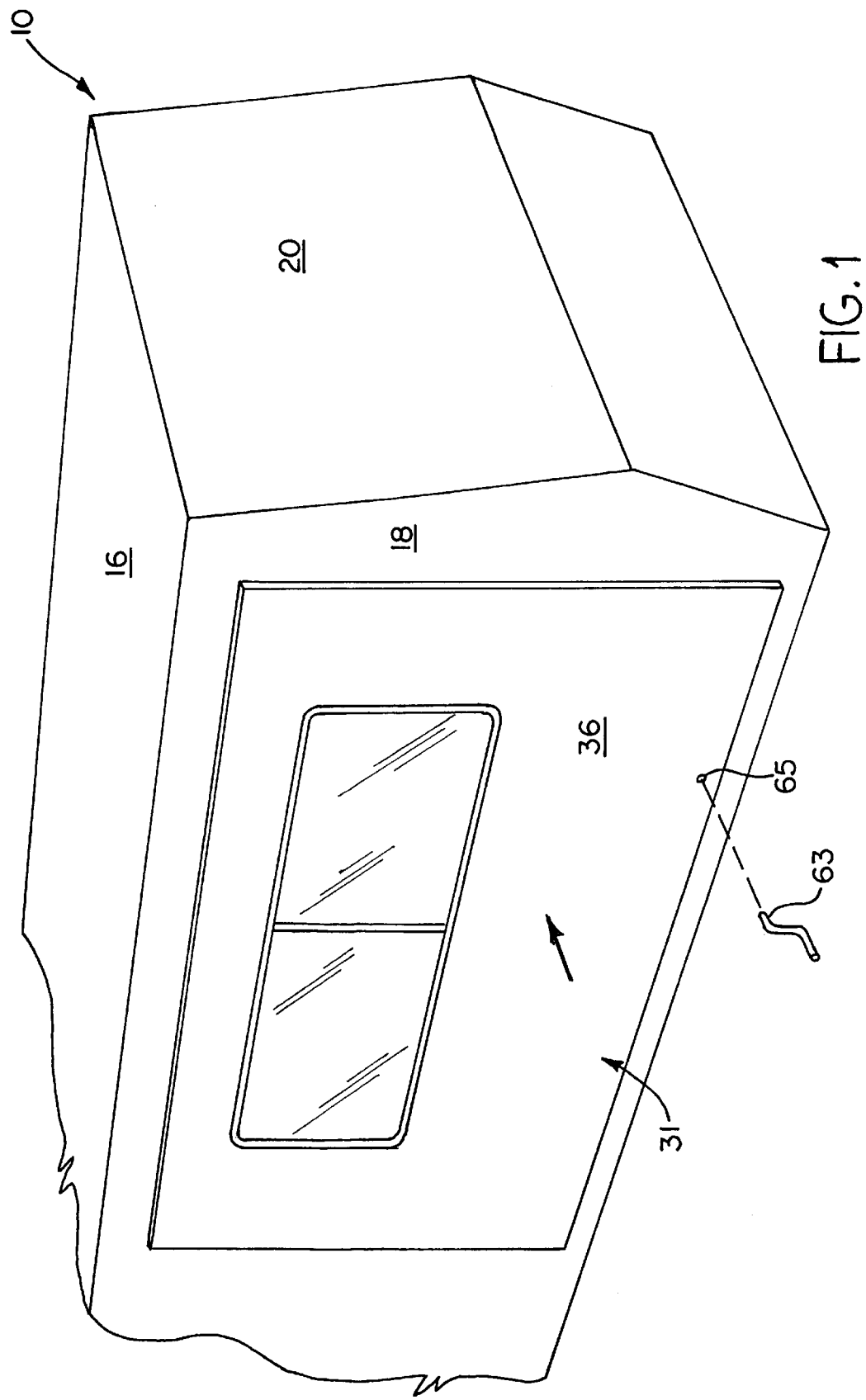
FIG. 1 is a fragmentary view in perspective of mobile living quarters incorporating a slide out room made pursuant to the teachings of the present invention, shown with the slide out room fully retracted into the main living quarters.

Referring now to the drawings, mobile living quarters, such as a recreational vehicles or manufactured housing, is generally indicated by the numeral 10 includes main living quarters generally indicated by the numeral 12 which is defined by main living area floor 14, main living area ceiling 16, and main living area side walls including side walls 18 and 20. Main living area side wall 18 defines an aperture generally indicated by the numeral 22, which is defined between an upper edge 24, a lower edge 26, and substantially parallel side edges 28, 30, which extend between the upper and lower edges 24, 26. A decorative molding 33 extends around the border of the aperture 22.

A slide out room generally indicated by the numeral 31 includes a slide out room floor 32, a slide out room ceiling 34, a slide out room front wall 36, and slide out room side walls 38, 40. The side of the slide out room 31 opposite the wall 36 is left open to provide access through the aperture 22 from the main living quarters to the auxiliary living quarters defined by the slide out room.

The floor 32 of the slide out room 31 is defined between a front floor frame member 42, which is attached to the front wall 36, a rear floor frame member 44 and parallel side frame members 46, 48 which are attached to the side walls 38, 40. A floor panel 50 is supported on the floor frame members 42–48. Rollers 52 are mounted on the rear floor frame member 44 and extend below the lower edge thereof to engage the main floor 14 to permit the slide out room 31 to extend and retract.

The slide out room 31 is extended from, and retracted into, the main living quarters by an actuation system generally indicated by the numeral 54. Actuation system 54 includes a conventional crank operated gear box 56 which is mounted in a notch 58 on the front floor frame member 42 and another gear box 60 which is operated by an electric motor 62 and which is secured in notch 64 in front floor frame member 42. Gear box 56 may be operated by extending a crank 63 through aperture 65 in front floor frame member 42. A drive shaft 69 interconnects the gear boxes 56, 60 so that operation of one of the gear boxes 56 or 60 by the crank 63 or motor 62 is transmitted to the other gear box. Substantially parallel threaded jack screws 66, 68 are threadedly connected to nut blocks 70, 72 which are secured to brackets 74, 76 on the lower edge 26 of the aperture 22. The ends of the jack screws 66, 68 are rotationally received in end blocks 75, 77 which are secured to rear floor frame member 44. Accordingly, operation of the gear boxes 56, 60 to cause the jack screws 66, 68 to rotate in one direction will, because of the threaded connection between the jack screws and the nut blocks 70, 72, extend the retractable room 31 to the extended position, whereas operation of the jack screws 66, 68 in the opposite direction will retract the slide out room 31 into the main living quarters.

The slide out room 31 is supported and guided for movement through the aperture 22 by support structures or three point linkages generally indicated by the numerals 78 and 80. The support structure 78 extends adjacent the side wall 38 of slide out room 31, and the support structure 80 extends adjacent the side wall 40 of the slide out room 31. Each of the support structures 78, 80 include a primary support arm 82, 84 which are connected to their corresponding side floor frame member 46 or 48 by a first adjustable pivot connecting mechanism 86, 88. The opposite end of the primary support arms 82, 84 are connected to the corresponding side edges 30, 28 of the aperture 22 through a second pivot connection 90, 92 which is slidably mounted for general vertical movement. Each of the second pivot connections 90, 92 include a sleeve 94, 96 which is slidably mounted on a shaft 98, 100 which is attached to the corresponding side edge 30 or 28 via brackets 102, 104. Pivot pins 105, 107 connect the upper ends of the support arms 82, 84 to the corresponding sleeve 94 or 96. Support structures 78, 80 also include secondary support arms 106, 108, which are connected to a corresponding one of the primary support arms 82 or 84 by a third pivot connection 110, 112. The opposite ends of the secondary support arms 106, 108 are pivotally secured to the side edges 30, 28 of aperture 22 at the lower end thereof adjacent the lower edge 26 by fourth pivot connections 114, 116. The secondary support arms 106, 108 prevent the slide out room 31 from dropping down as the room slides out as the sliding connection between the sleeves 94, 96 and the shafts 98, 100 and thus maintain the slide out room substantially level as it extends and retracts.

Figure 2:
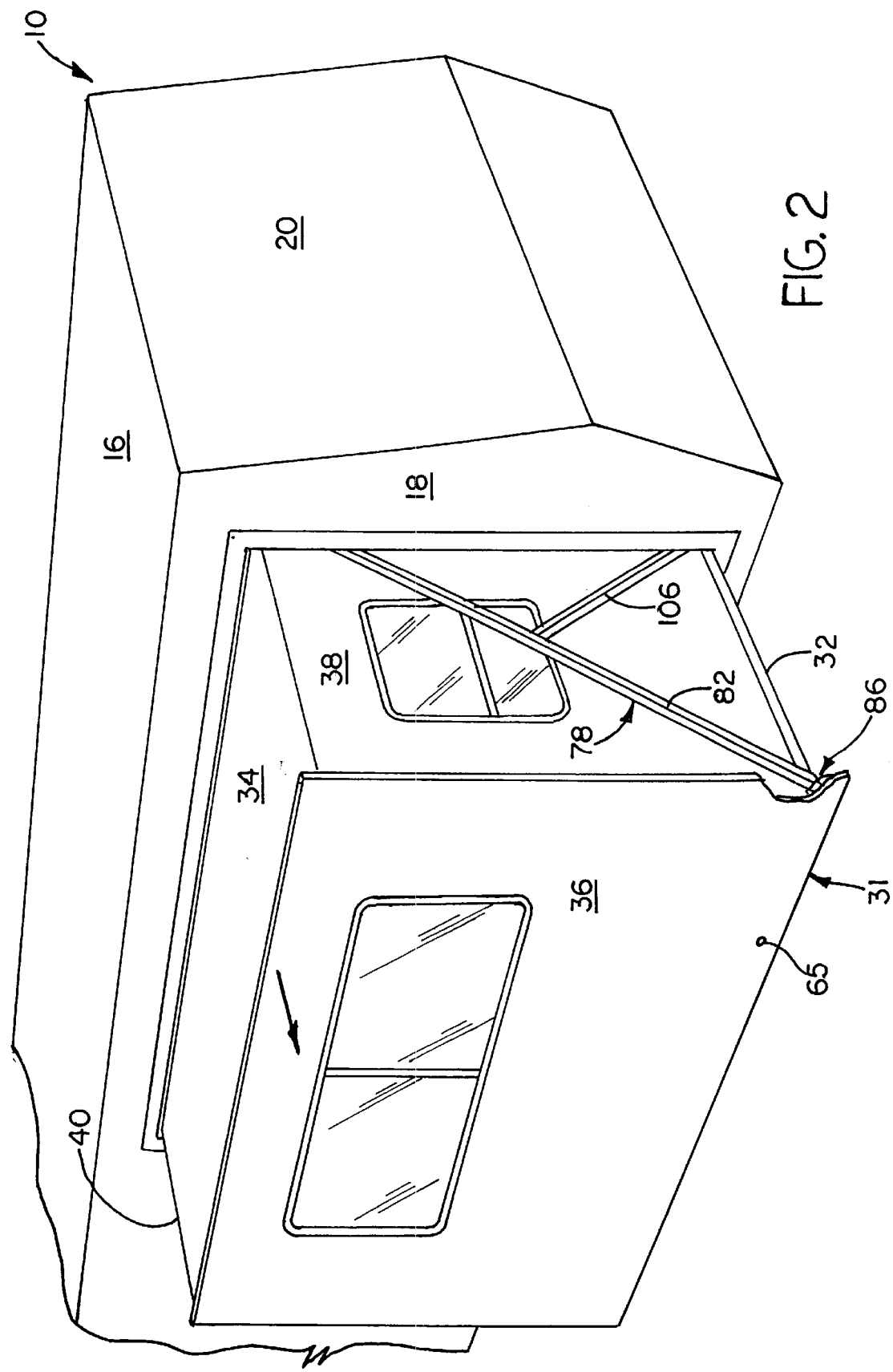
FIG. 2 is a view similar to FIG. 1, but illustrating the slide out room in its fully extended position.
Figure 3:
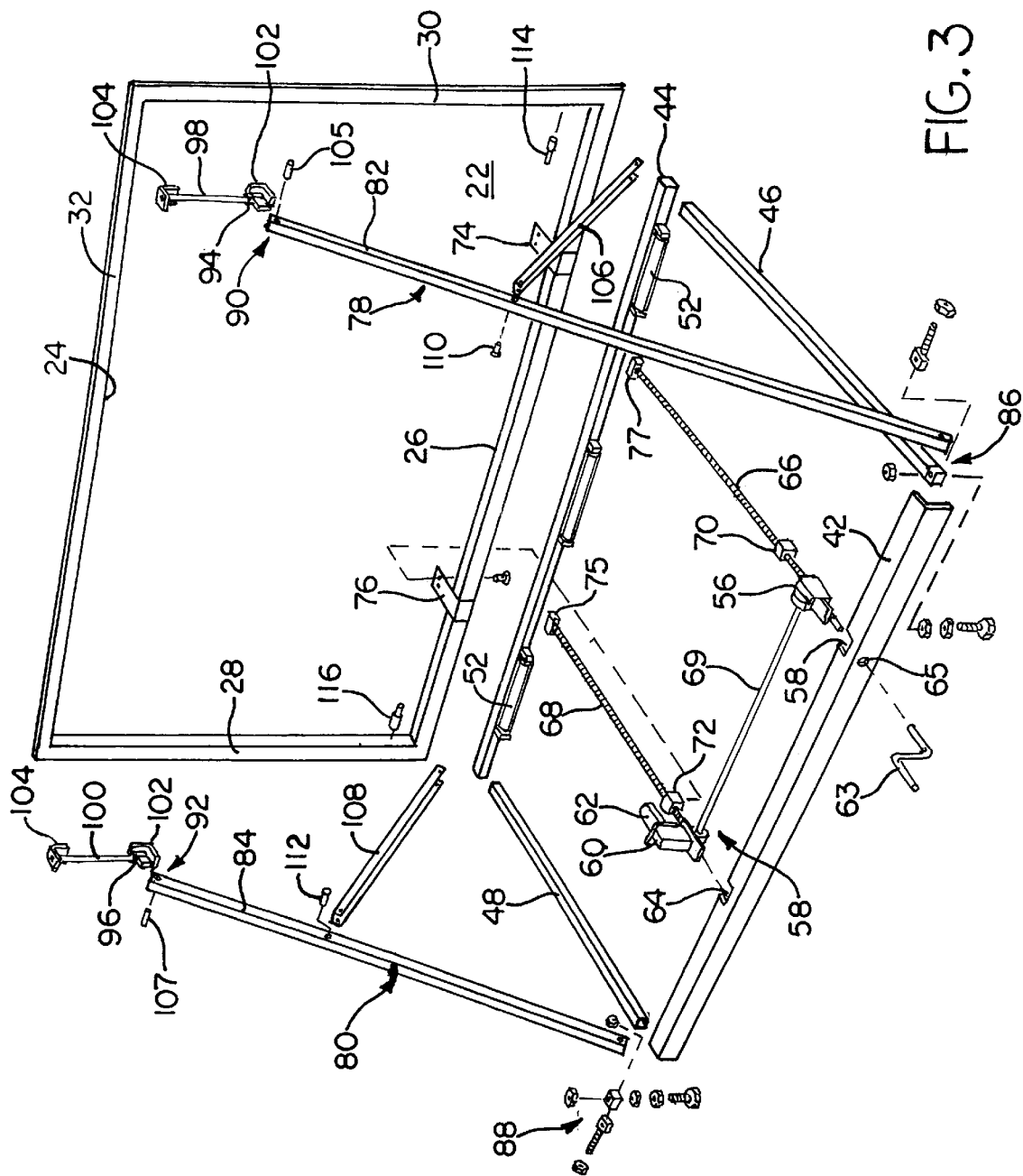
FIG. 3 is an exploded view of perspective of the various components of the support and actuating mechanisms constituting the present invention.
Figure 4:
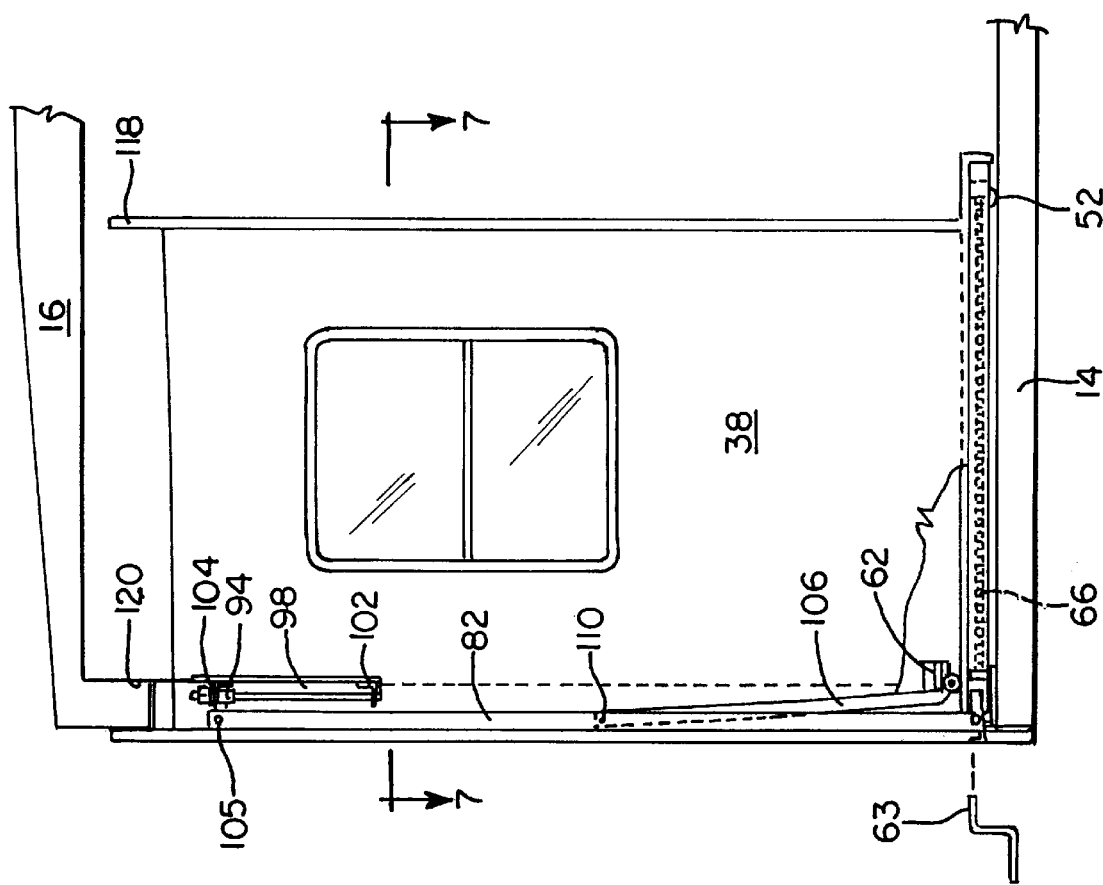
FIG. 4 is a fragmentary, transverse cross-sectional view of the slide out room and support structure according to the present invention with the slide out room illustrated in its fully retracted position.
Figure 5:
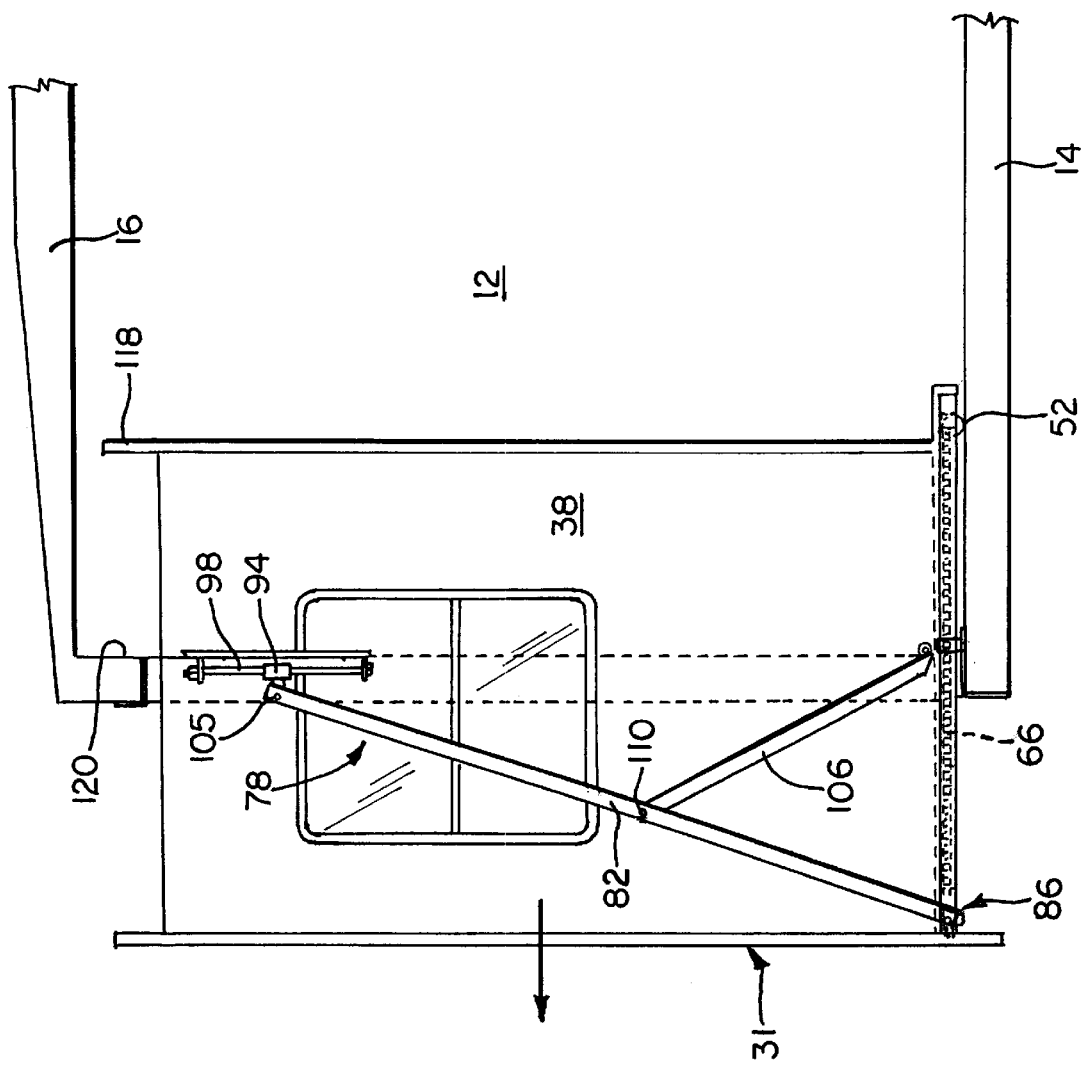
FIG. 5 is a view similar to FIG. 4, but illustrating the slide out room in its partially extended position.
Figure 6:
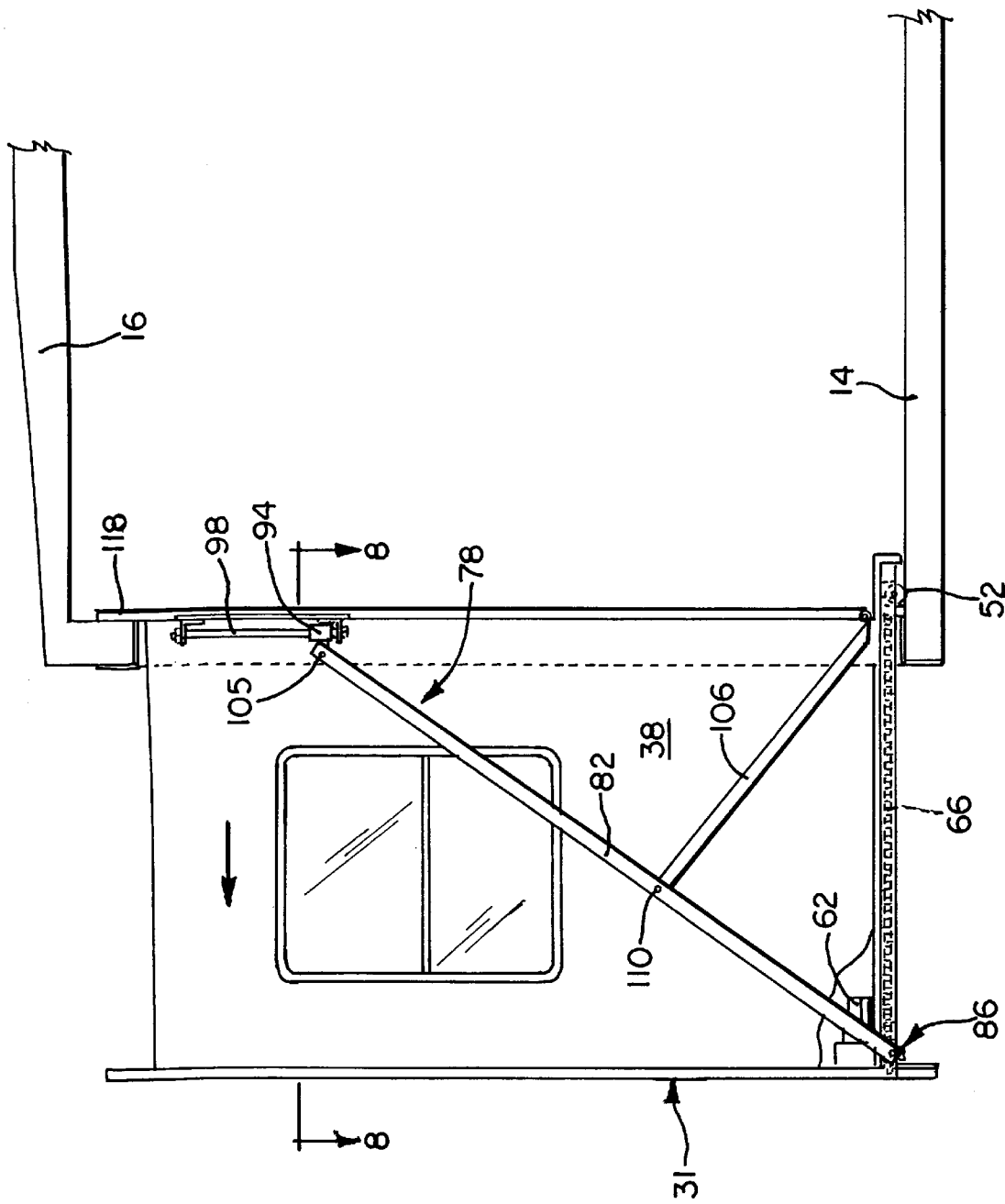
FIG. 6 is a view similar to FIG. 5, but illustrating the slide out room in its fully extended position.
Figure 7:
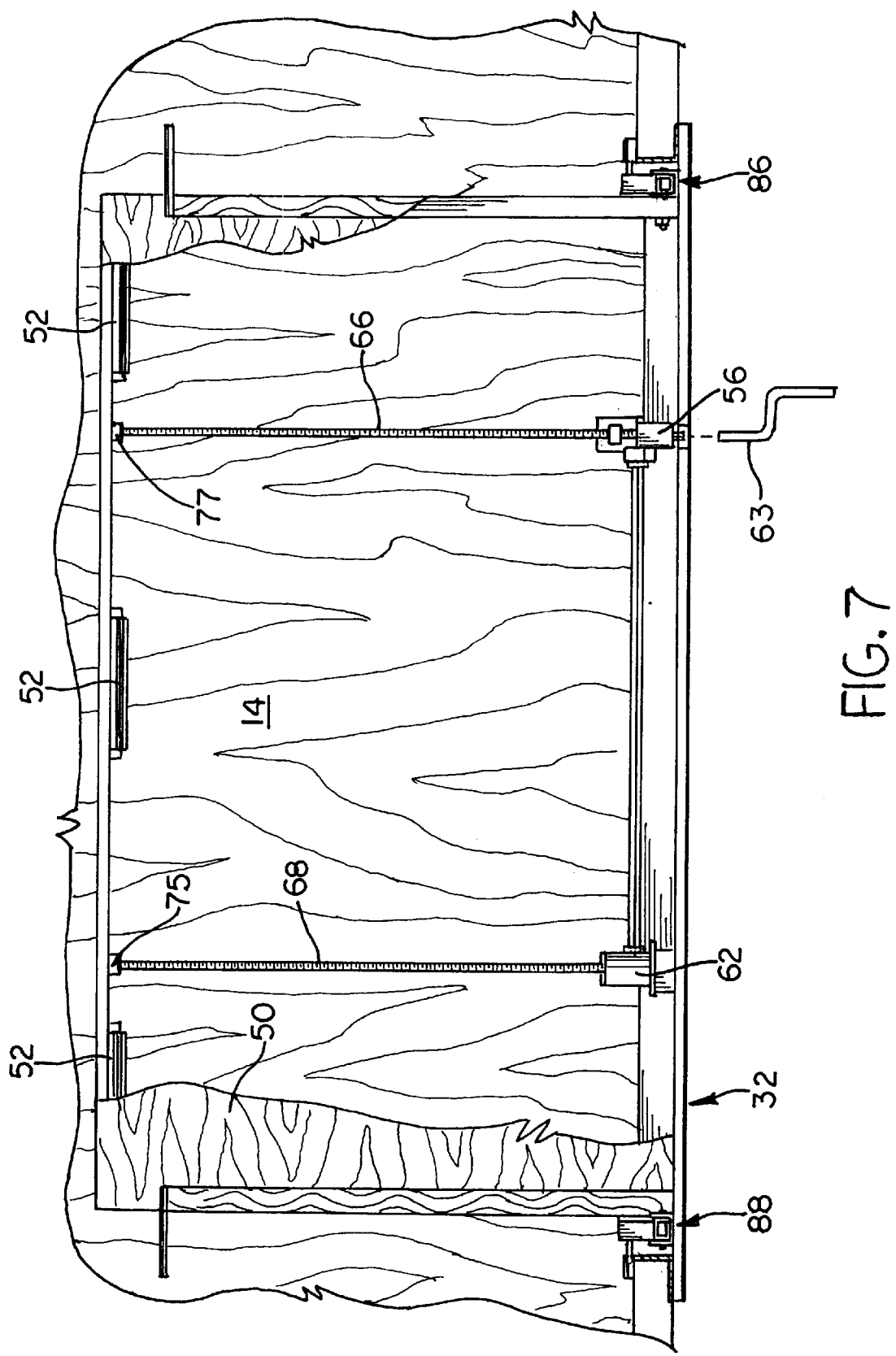
FIG. 7 is a fragmentary cross-sectional view taken substantially along lines 7—7 of FIG. 4.
Figure 8:
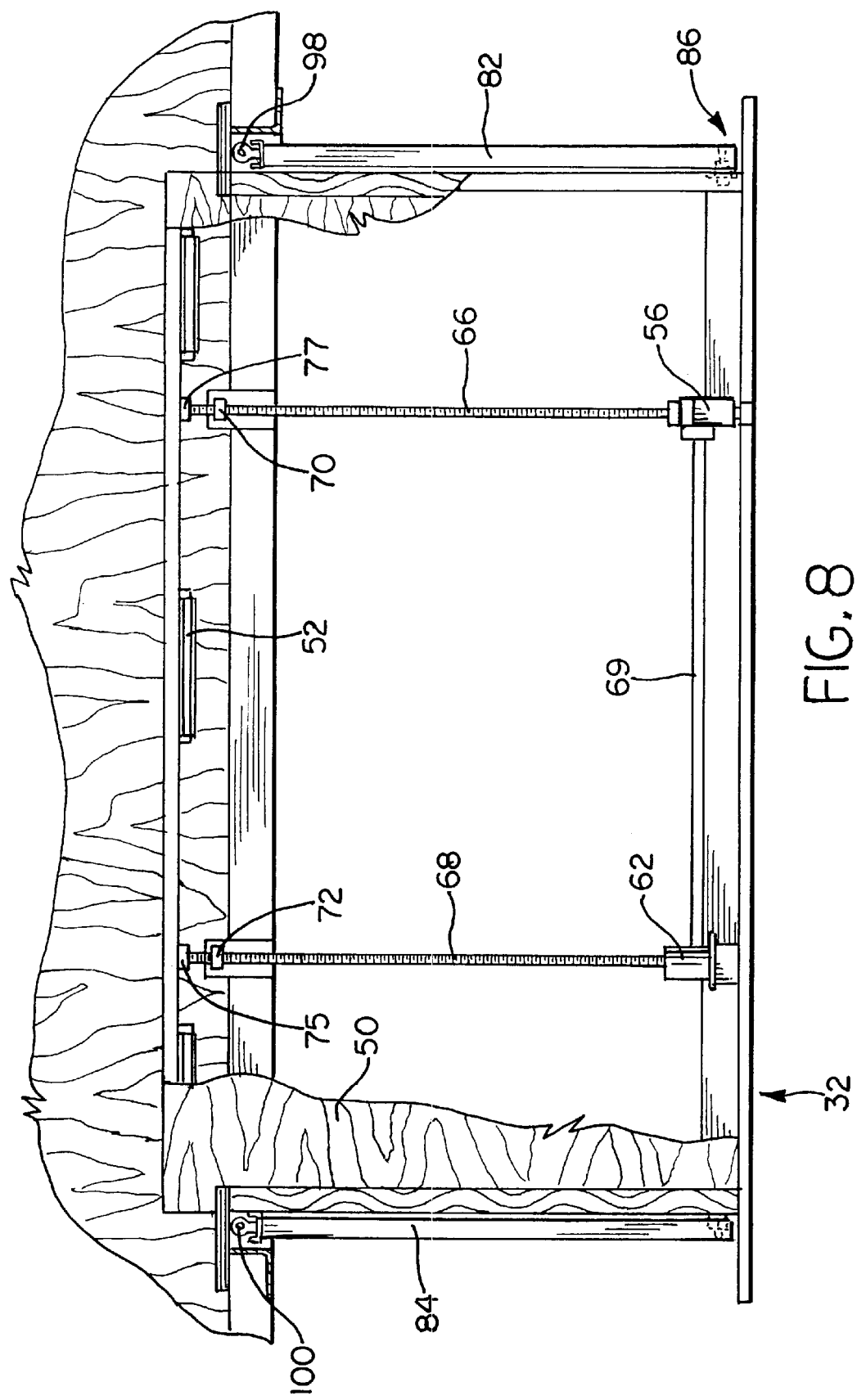
FIG. 8 is a fragmentary cross-sectional view taken substantially along lines 8—8 of FIG. 6.
Figure 9:
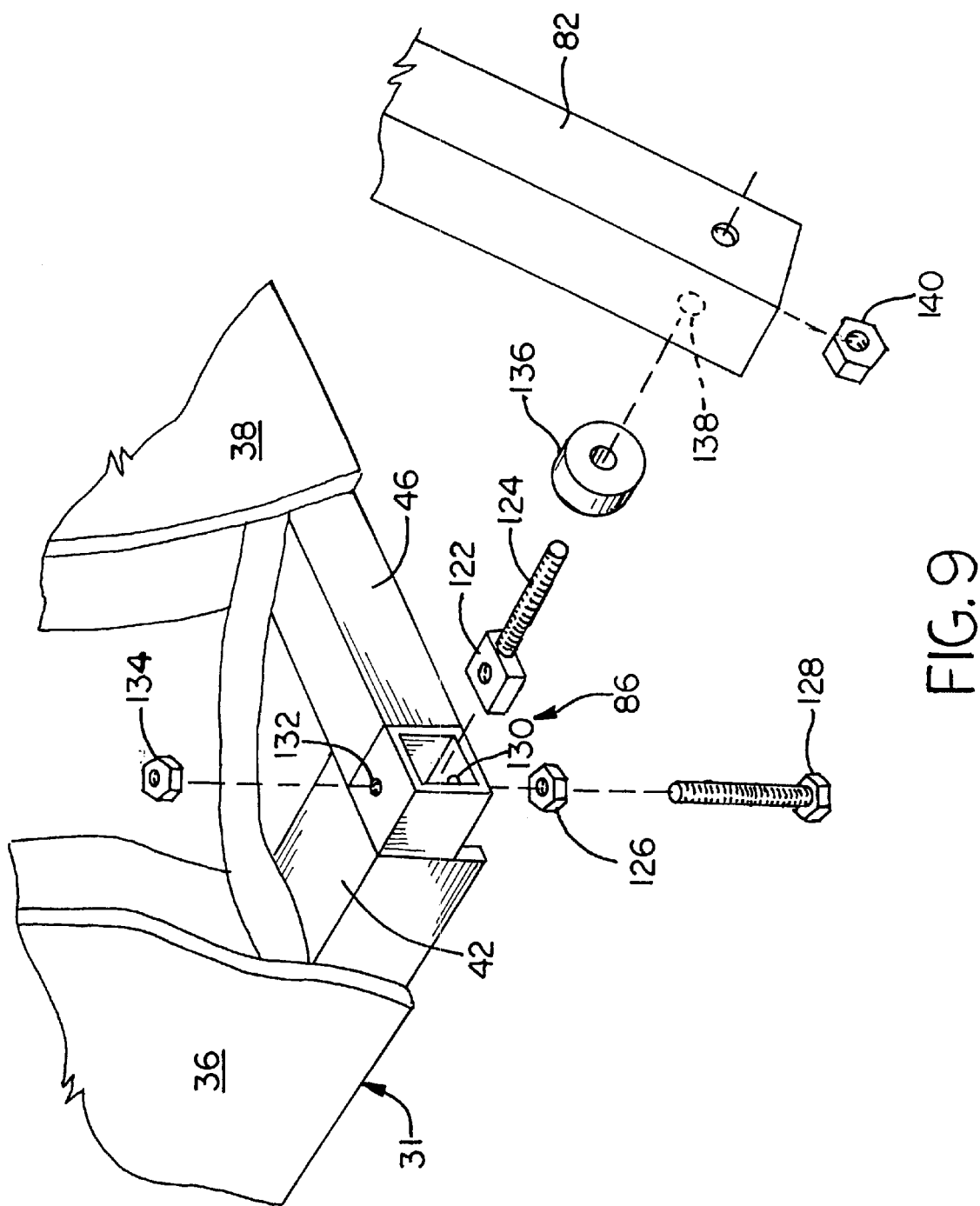
FIG. 9 is a fragmentary exploded view in perspective illustrating the adjustable connection between the supporting structure and the floor of the slide out room of the present invention.
Figure 10:
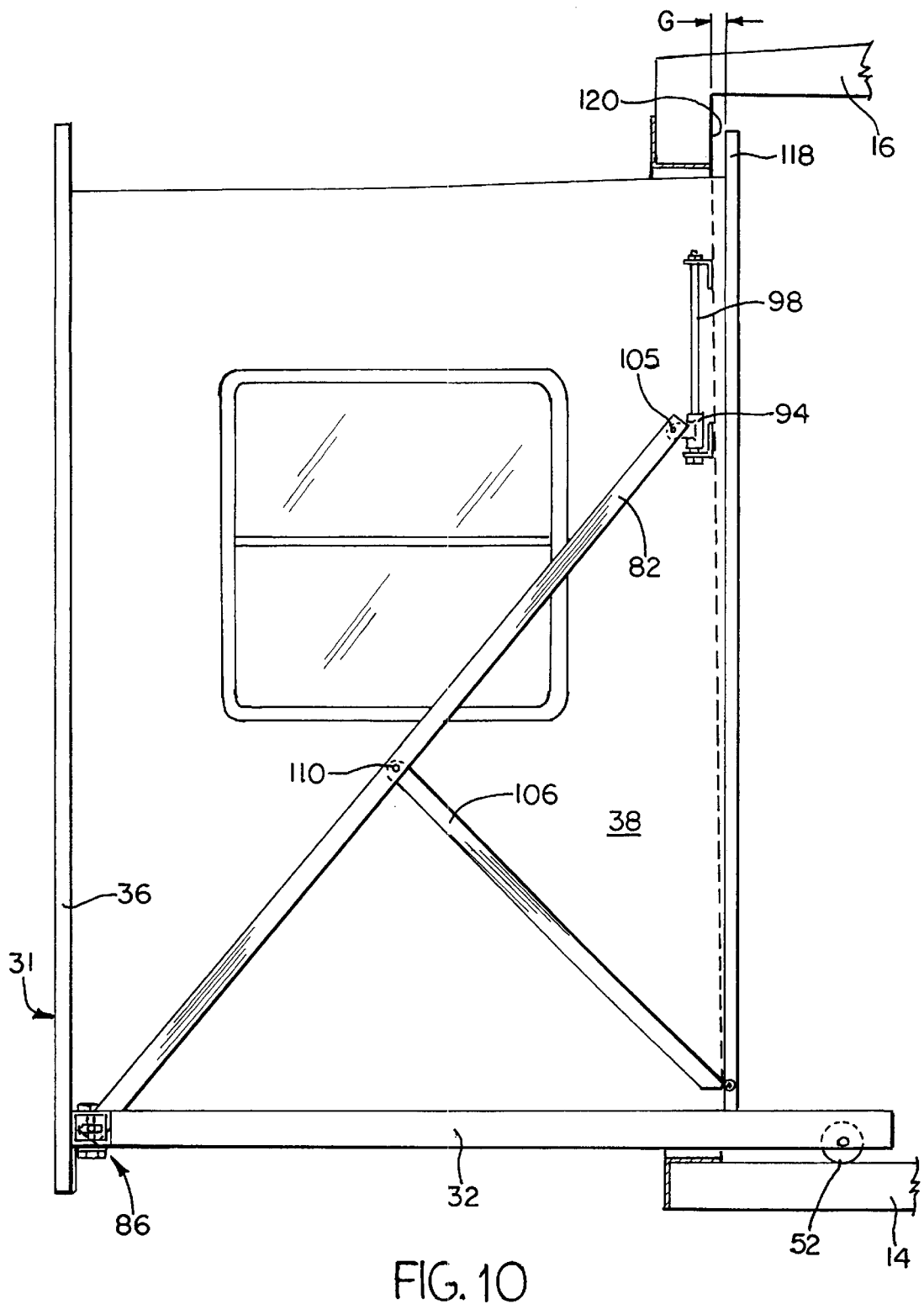
FIG. 10 is a fragmentary side elevational view of a portion of the main living quarters and of the slide out room, the slide out room being illustrated in its fully extended position.
Figure 12:
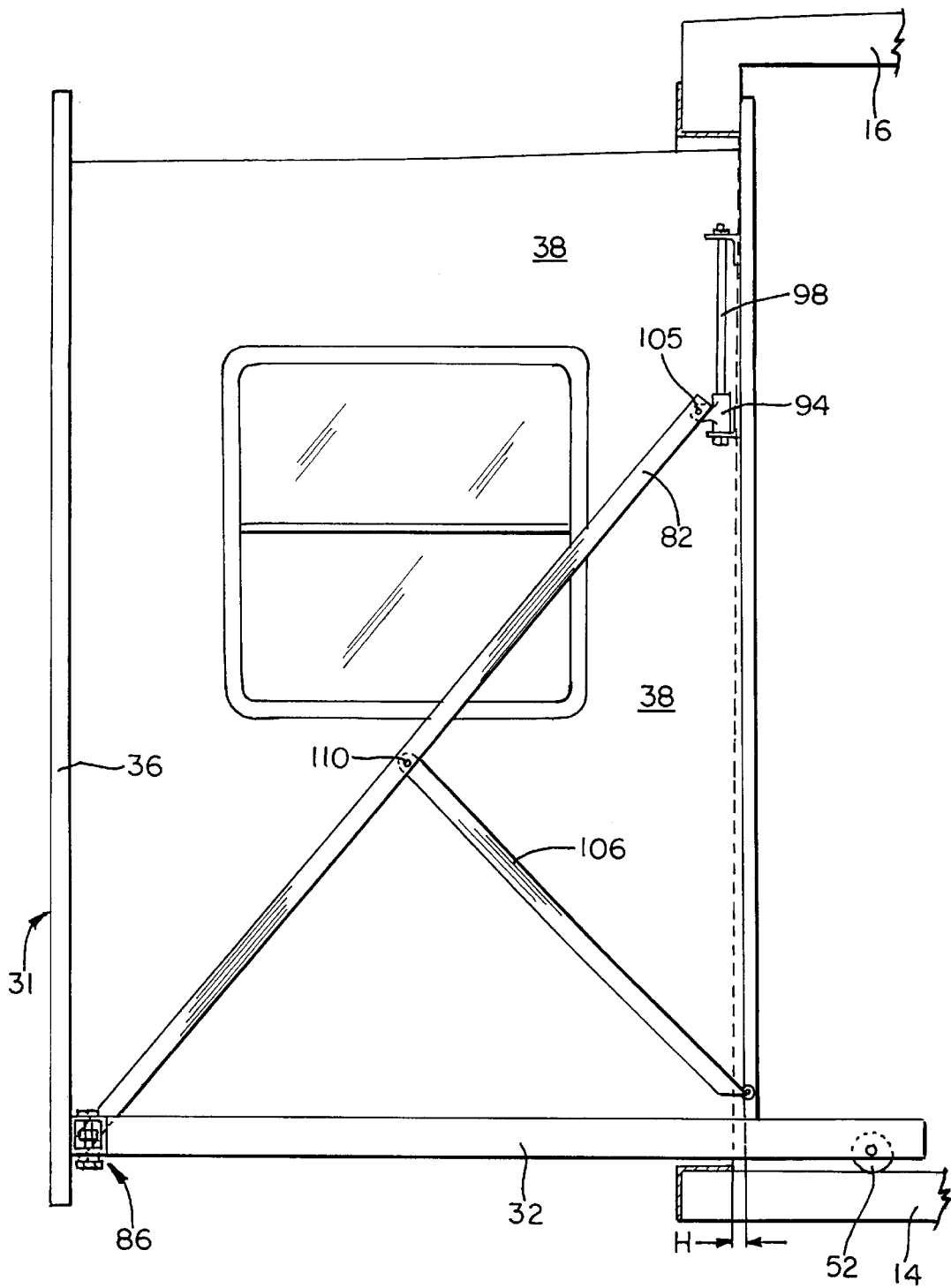
FIG. 12 is a view similar to FIGS. 10 and 11, but showing excessive clearance between the bottom edge of the walls and the main living unit and the slide out room.

When slide out room 31 is in the fully extended position as illustrated in FIG. 2, a seal is effected between the flange 118 which circumscribes the walls 38, 40 and ceiling 34 and projects outwardly therefrom and a corresponding sealing portion 120 of the wall 18. However, even though the slide out room 31 is maintained level by linkages 78 and 80, if the wall 18 is not plumb, a gap indicated by the letter G (FIG. 10) may be formed by that portion of the flange 118 extending along the ceiling 34 and the portion of sealing surface 120 adjacent the upper portion of the wall 18. If the wall 18 is off plumb slightly in the opposite direction, a gap, such as the gap H, (FIG. 12) may occur between the lower portions of the flanges 18 extending adjacent the side walls 38 and 40 and the portion of the sealing surface 120 adjacent the lower portion 18. Accordingly, the pivot connecting mechanisms 86 and 88 are provided with an adjustable feature to take up the gaps G and H. Referring to FIG. 9, pivot connecting mechanism 86 (since pivot connecting mechanism 88 is identical, only the pivot connecting mechanism 86 will be described in detail) includes a nut 122 from which a threaded pivot pin 124 extends. A threaded nut 126 is threaded onto an adjusting bolt 128 which in turn is extended through an aperture 130 in a portion of the member 42 adjacent where the member 42 is secured to the member 46. The nut 122 is then threaded on the adjusting bolt 128, and the latter is then passed through aperture 132 and retained by threaded nut 134. Accordingly, rotation of the bolt 128 causes the pivot pin 124, due to the threaded connection between the nut 122 and the bolt 128, to move up and down the limited amount permitted by the member 42. A spacer or bushing 136 is installed, and the pivot pin 124 is then installed through an opening 138 in support arm 82 and is then secured by nut 140.

In operation, when the slide out room 31 is to be extended or retracted, either the motor 62 or the crank 63 may be used to cause the jack screws 66, 68 to turn in the same direction to either extend or retract the slide out room 31. During movement of the slide out room, the lower portion of the room is supported by the engagement of rollers 52 with the main floor 14, and the front portion of the slide out room 31 is supported by the support arms 82 and 84. As the slide out room extends and retracts, the sleeves 94, 96 move vertically along the shafts 98 and 100, thereby, enabling support arms 82, 84 and secondary support arms 106, 108 to maintain the floor 50 of slide out room 31 in a substantially horizontal orientation.

Figure 11:
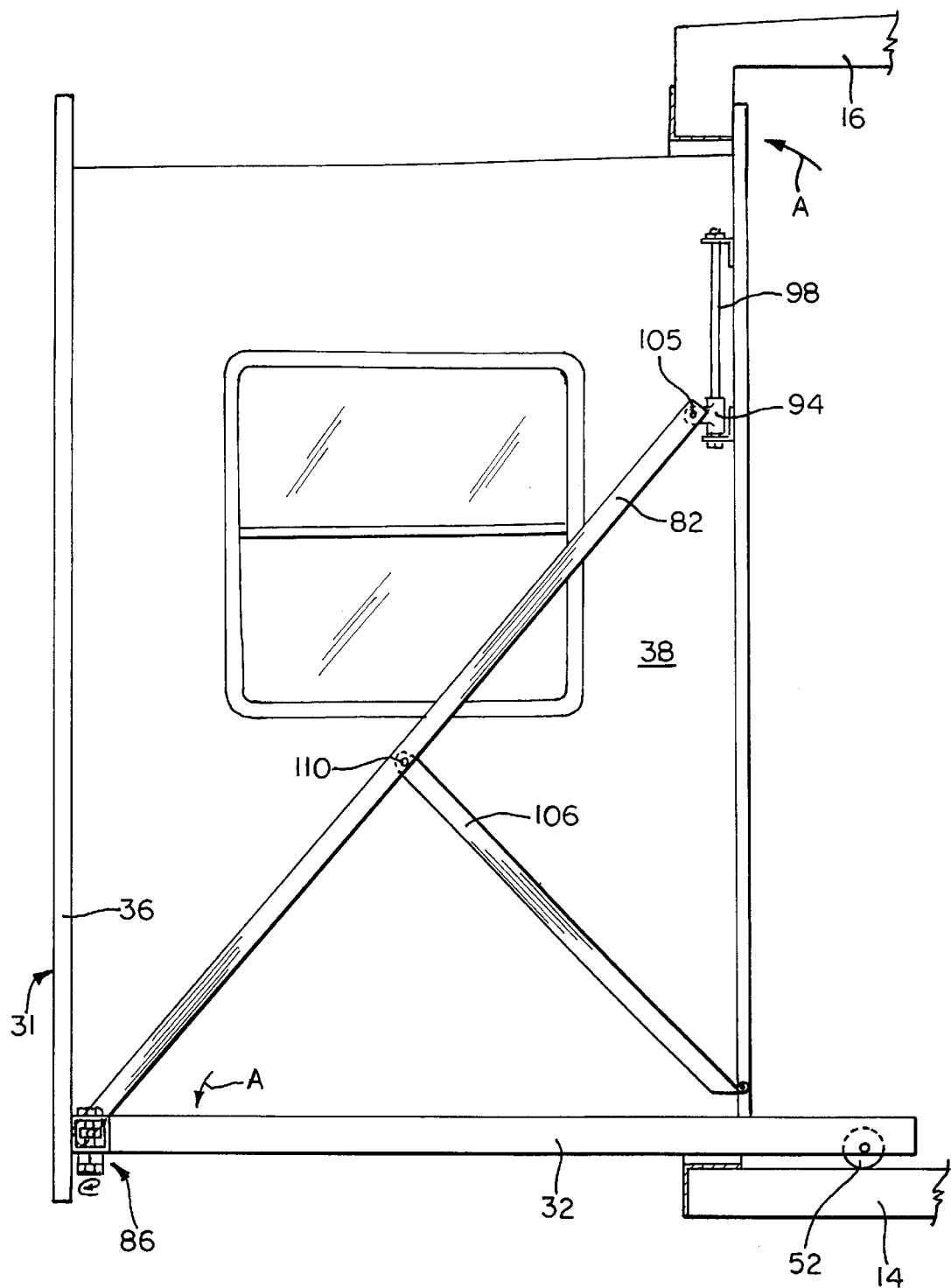
FIG. 11 is a view similar to FIG. 10, but illustrating operation of the adjustment mechanism to take up the clearance between the slide out room and the main living quarters.
Figure 13:
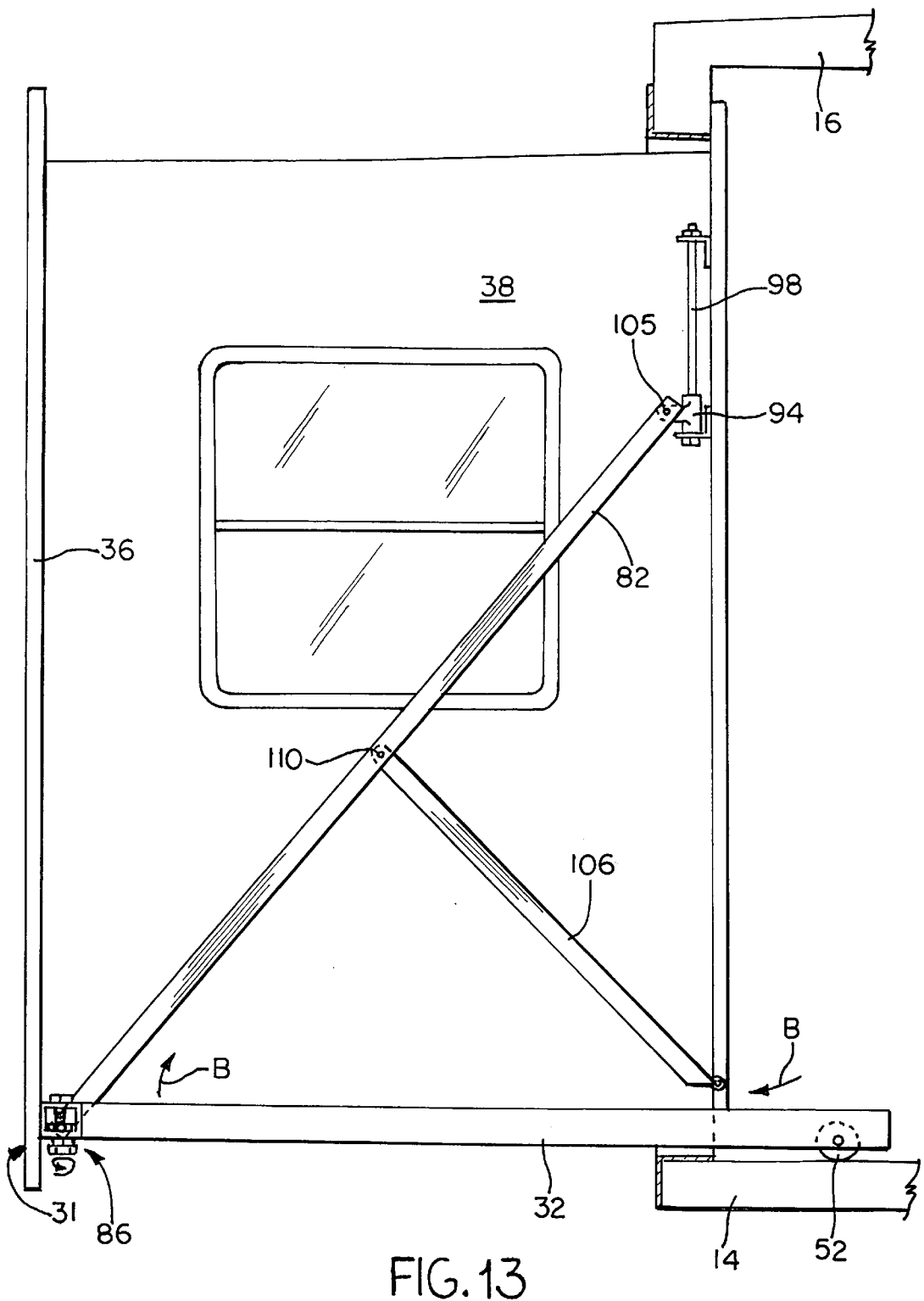
FIG. 13 is a view similar to FIGS. 10–12, but illustrating the manner in which the adjustment mechanism is operated to take up the excessive clearance illustrated in FIG. 12.

As discussed above, even though the linkages 80, 82 support the room 31 so that the room 31 will not bind upon extension or retraction, the gap G may nevertheless occur if the wall 18 is out of plumb. To take up the gap G, the adjusting bolts 128 of the pivot connecting mechanisms 86, 88 are rotated in a direction moving the nuts 122 upwardly viewing FIGS. 10 and 11, urging the sleeves 94, 96 upwardly an amount sufficient to allow the room 31 to rotate in the direction of the arrows A an amount sufficient to take up the gap G. It will be noted that a very small adjustment at the end where the support arms 80, 82, is multiplied by the length of the arm to a larger adjustment of the sleeves 94, 96. If the wall 18 is out of plumb in the opposite direction, a gap H is opened between the lower portion of the wall 18 and the corresponding portion of the flange 118. To take up this gap, the bolts 128 are rotated in a direction moving the nut 122 downwardly (FIGS. 12 and 13), thereby rotating the room 31 in the direction indicated by the arrows B an amount sufficient to take up the gap H.

What is claimed:

1. Mobile living quarters comprising a frame, a main living area floor and main living area walls mounted on said frame defining a main living area, a retractable room mounted for movement from a retracted position retracted into the main living area to an extended position extended from the main living area to provide an auxiliary living area, said retractable room being retractable through an aperture in one of the walls defining the main living area and having a retractable room floor and retractable room walls defining said auxiliary living area, a support structure pivotally mounted on said retractable room by a first pivot connection and pivotally mounted on said main living area by a second pivot connection, one of said pivot connections being mounted for sliding movement in a first direction relative to the main living area and an actuating mechanism for actuating the movement of the slide-out room, said actuating mechanism operating in a second direction at an angle to said first direction.

2. Mobile living quarters as claimed in claim 1, wherein said second pivot connection is slidably mounted on said main living quarters.

3. Mobile living quarters as claimed in claim 1, wherein said first pivot connection includes an adjusting mechanism for adjusting the position of the first pivot connection relative to the retractable room.

4. Mobile living quarters as claimed in claim 1, wherein said support structure extends between said retractable room floor and said one wall, said second pivot connection being slidably mounted on said one wall for movement relative thereto.

5. Mobile living quarters as claimed in claim 4, wherein said retractable room floor includes a front edge, a pair of side edges extending from said front edge through the aperture, and a rear edge interconnecting said side edges, and rollers for supporting said rear edge on said main living area floor for movement across said main living area floor as said retractable room is moved between the extended and retracted positions.

6. Mobile living quarters as claimed in claim 4, wherein said retractable room floor includes a front edge, a pair of side edges extending from said front edge through the aperture, and a rear edge interconnecting said side edges, said first pivot connection securing said first support arm to one of said side edges of the retractable room floor adjacent the front edge of the retractable room floor.

7. Mobile living quarters as claimed in claim 4, wherein said second pivot connection includes a pivot pin connecting said support structure with a sliding member, and a guide for guiding said sliding member for vertical movement relative to said one wall.

8. Mobile living quarters as claimed in claim 7, wherein said support structure includes a first support arm extending between said first and second pivot connections and a second support arm extending between a third pivot connection on said first support arm and a fourth pivot connection on said main living quarters.

9. Mobile living quarters as claimed in claim 8, wherein said aperture is defined by a top edge, a bottom edge, and side edges connecting the top and bottom edges, said fourth pivot connection being secured to the main living quarters adjacent the bottom edge of the aperture.

10. Mobile living area as claimed in claim 8, wherein said second pivot connection is mounted on said main living quarters adjacent the top edge of the aperture.

11. Mobile living quarters as claimed in claim 8, wherein said third pivot connection connects said second support arm to said first support arm at a point between said first and second pivot connections.

12. Mobile living quarters as claimed in claim 8, wherein said retractable room floor includes a front edge, a pair of side edges extending from said front edge through the aperture, and a rear edge interconnecting said side edges, and rollers for supporting said rear edge on said main living area floor for movement across said main living area floor as said retractable room is moved between the extended and retracted positions.

13. Mobile living quarters as claimed in claim 8, wherein said retractable room floor includes a front edge, a pair of side edges extending from said front edge through the aperture, and a rear edge interconnecting said side edges, said first pivot connection securing said first support arm to one of said side edges of the retractable room floor adjacent the front edge of the retractable room floor.

14. Mobile living quarters comprising a frame, a main living area floor and main living area walls mounted on said frame defining a main living area, a retractable room mounted for movement from a retracted position retracted into the main living area to an extended position extended from the main living area to provide an auxiliary living area, said retractable room being retractable through an aperture in one of the walls defining the main living area and having a retractable room floor and retractable room walls defining said auxiliary living area and support structure pivotally mounted on said retractable room for supporting and guiding movement of said auxiliary living area between the extended and retracted positions, said support structure comprising a first linkage member pivotally mounted at each end where said first linkage member is connected to a position adjacent atop edge of said aperture and at the opposite end adjacent the lower edge of the auxiliary living area, said first end being pivotable so as to be slidable along a vertical axis relative to said mobile living quarters, and an actuating mechanism for actuating the movement of the slideout room said actuating mechanism operating in a direction at an angle to said vertical axis.

15. The mobile living quarters of claim 14, wherein said support structure further comprises a second linkage member, where a first end of said second linkage member's pinned to said first linkage member intermediate said ends, and a second end of said second linkage member is pinned at a position adjacent a lower edge of said aperture.

* * * * *